US006845652B2

United States Patent
Stegmann et al.

(10) Patent No.: US 6,845,652 B2
(45) Date of Patent: Jan. 25, 2005

(54) METHOD AND DEVICE FOR DIAGNOSING TANK LEAKS USING A REFERENCE MEASURING METHOD

(75) Inventors: Volk r Stegmann, Bretten (DE);
Thorsten Fritz, Gaggenau (DE);
Martin Streib, Vaihingen (DE); Peter Wiltsch, Wimshen (DE); Armin Hassdenteufel,
Sachsenheim-Ochsenbach (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/178,459

(22) Filed: Jun. 24, 2002

(65) Prior Publication Data

US 2003/0015022 A1 Jan. 23, 2003

(30) Foreign Application Priority Data

Jun. 22, 2001 (DE) ......................................... 101 29 695

(51) Int. Cl.[7] .............................................. G01M 3/04
(52) U.S. Cl. .......................................... 73/49.2; 702/51
(58) Field of Search ................................ 73/49.2, 49.7, 73/40, 40.5 R; 123/520; 702/51

(56) References Cited

U.S. PATENT DOCUMENTS

| 5,297,529 | A | * | 3/1994 | Cook et al. ................. 123/520 |
| 5,347,971 | A | | 9/1994 | Kobayashi et al. ......... 123/520 |
| 5,349,935 | A | | 9/1994 | Mezger et al. .............. 123/520 |
| 5,461,906 | A | * | 10/1995 | Bogle et al. ................. 73/49.2 |
| 5,467,641 | A | * | 11/1995 | Williams et al. ............. 73/49.7 |
| 5,495,749 | A | * | 3/1996 | Dawson et al. ............. 73/49.7 |
| 5,509,296 | A | * | 4/1996 | Kolb ....................... 73/40.5 R |
| 5,526,679 | A | * | 6/1996 | Filippi et al. ............. 73/40.5 R |
| 5,546,789 | A | * | 8/1996 | Balke et al. .................... 73/40 |
| 5,898,103 | A | * | 4/1999 | Denz et al. .................... 73/49.2 |
| 6,014,958 | A | * | 1/2000 | Miwa et al. ................. 123/520 |
| 6,116,082 | A | * | 9/2000 | Pride ....................... 73/40.5 R |
| 6,321,728 | B1 | * | 11/2001 | Ohkuma ..................... 123/520 |
| 6,357,288 | B1 | * | 3/2002 | Shigihama et al. ........ 73/118.1 |
| 6,550,315 | B2 | * | 4/2003 | Streib ......................... 73/49.7 |

FOREIGN PATENT DOCUMENTS

| DE | 196 25 702 | 1/1998 |
| DE | 196 36 431 | 3/1998 |
| DE | 198 09 384 | 9/1999 |
| DE | 199 42 185 | 3/2001 |
| DE | 100 18 441 | 10/2001 |
| JP | 6 173837 | 6/1994 |

* cited by examiner

Primary Examiner—Charles D. Garber
(74) Attorney, Agent, or Firm—Kenyon & Kenyon

(57) ABSTRACT

In a method and a device for leak testing of a vessel, e.g., a tank venting system of a motor vehicle, a leak-tightness measurement is performed by introducing a positive pressure or partial vacuum and detecting the variation over time of a positive pressure or partial vacuum in the vessel, and a reference measurement is performed using a reference leak. A conclusion is drawn as to the presence of a leak in the vessel by comparing the results of the leak-tightness measurement and the reference measurement. To avoid faulty diagnoses, the positive pressure or partial vacuum during the leak-tightness measurement and the reference measurement is detected by using a single pressure measuring device.

4 Claims, 1 Drawing Sheet

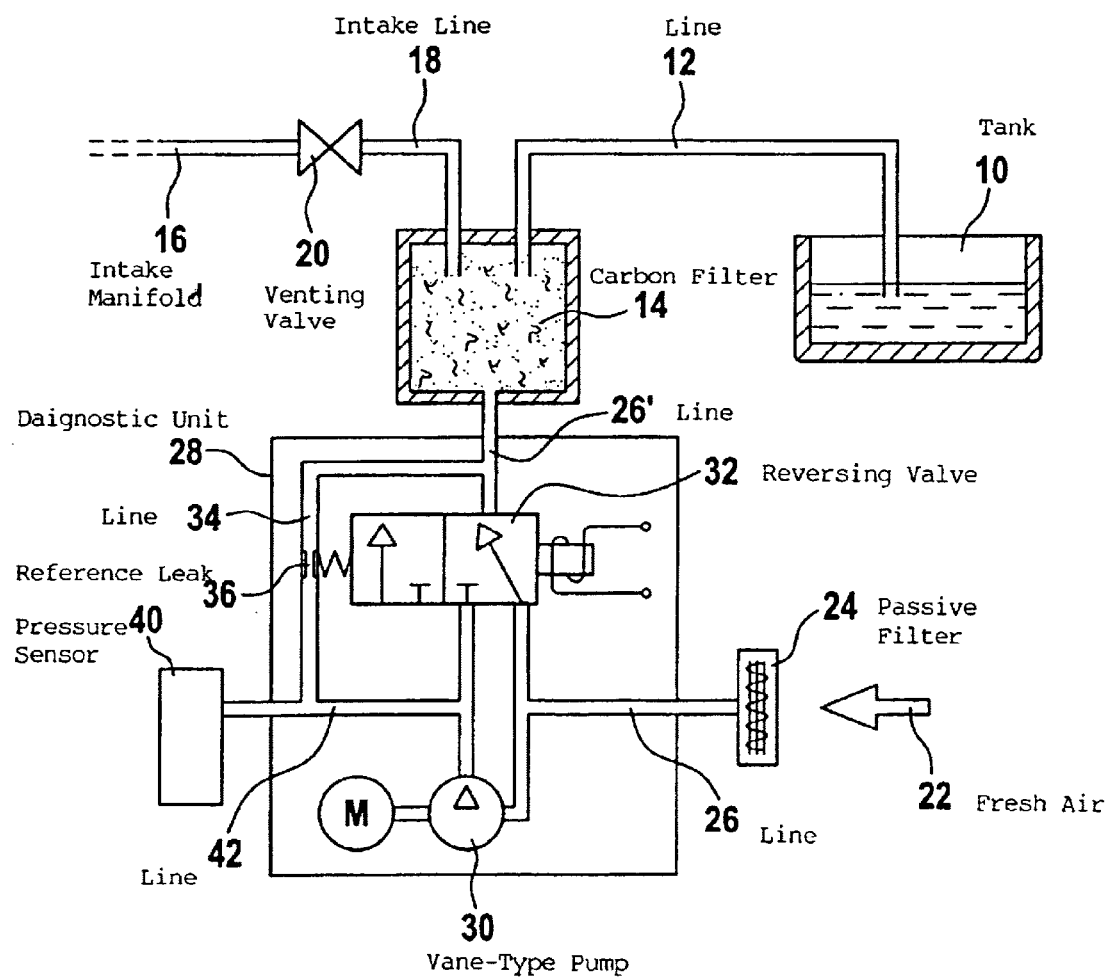

METHOD AND DEVICE FOR DIAGNOSING TANK LEAKS USING A REFERENCE MEASURING METHOD

FIELD OF THE INVENTION

The present invention relates to a method and a device for testing the operability of a vessel, e.g., a tank venting system of a motor vehicle.

BACKGROUND INFORMATION

Vessels are regularly tested for leak-tightness in many different technical fields. In the chemical processing industry, for example, testing is performed on liquid or gas vessels, or in the automotive industry, on tank systems.

In the automotive engineering industry in the United States, for example, future regulatory requirements for the operation of internal combustion engines will be more stringent. Accordingly, for motor vehicles in which volatile fuels such as gasoline are used, a control device may be included that may detect, by onboard means, the presence of any leak having a size of 0.5 mm, in the tank or in the entire fuel tank system.

Such a method for leak testing of a tank venting system of a motor vehicle is described in U.S. Pat. No. 5,349,935, German Published Patent Application No. 196 36 431, German Published Patent Application No. 198 09 384, and German Published Patent Application No. 196 25 702. As described in the referenced documents, the tank venting system is subjected to a positive pressure, and a conclusion as to the presence of a leak may be drawn from subsequent evaluation of the variation of pressure.

Similar methods are also described in Japanese Patent No. 6-173837 and U.S. Pat. No. 5,347,971 in which a reference leak is connected to the tank venting system and, by comparing measurements with and without the reference leak, a conclusion is drawn as to the presence of a leak.

In addition, German Published Patent Application No. 196 36 431 describes a method whereby a dynamic pressure is generated between an electrically driven pump and a reference leak having a cross section of 0.5 mm which pressure decreases the pump rotational speed and simultaneously increases its electrical power consumption. The intensity of the resulting steady-state electrical current is determined and temporarily stored, and the generated air flow of the pump is then pumped into the tank via a reversing valve, past the reference leak. If the tank is leak-tight, a higher pressure develops than when pumping is performed against the reference leak. The electrical power consumption of the pump is thus higher than in the case of the reference leak. For a leak having a cross-sectional opening larger than 0.5 mm, however, the pressure which develops is less than the reference pressure, and the power consumption is therefore lower.

Furthermore, German Published Patent Application No. 100 18 441 describes leak testing according to the aforementioned reference measurement principle; however, the method is performed by introducing a partial vacuum into the tank venting system.

Consequently, in the methods and devices described above, the presence of a leak is indicated only indirectly, based on the aforementioned power consumption of the pump. This has the disadvantage that the result of the leak diagnosis is greatly dependent on the characteristics of the pump used, such as the effect of moisture on the electrical pump current. The measured current then no longer corresponds to the existing pressure conditions, resulting in faulty identification of the degree of leak-tightness.

SUMMARY OF THE INVENTION

It is an object of the present invention, therefore, to improve a previously referenced method and device to avoid the aforementioned disadvantages, e.g., the previously described faulty diagnoses.

The characteristic feature of the present invention lies in the fact that the positive pressure or partial vacuum is determined by a single pressure measuring device during both leak testing and reference testing. Using only one pressure sensor for both the reference testing and for the actual leak testing on the vessel automatically results in reliable calibration between the two stated diagnostic steps.

By observing the aforementioned reference measuring principle, faulty measurements and diagnoses are effectively avoided by the direct pressure measurement in both diagnostic steps. Thus, the leak diagnosis is performed independently of, for example, the electrical power characteristics of the pump used, such as the electrical properties of the pump motor, and is therefore more dependable and less susceptible to errors than are the conventional methods.

The operability of the pump, for example, a jammed pump vane, may be diagnosed during the time that the pressure measuring device is detecting a pressure signal.

After a leak has been diagnosed by the build-up of pressure in the vessel, the pressure reduction rate may be used to further check the leak-tightness of the entire tank system by turning off the pump while keeping the valve position unchanged.

According to one example embodiment, the reference leak is situated so that in the open position it is sealingly connected to the vessel or the tank venting system. This measure ensures that, when a leak diagnosis is performed by using positive pressure, the vaporous or gaseous medium flowing from the reference leak remains inside the vessel or tank venting system, thereby guaranteeing that no contaminated vapor or gas escapes to the environment. Furthermore, the need for at least one additional passive filter is eliminated.

The present invention is explained in greater detail below, with reference to the drawing, by an example embodiment showing additional features and advantages of the present invention.

BRIEF DESCRIPTION OF THE DRAWING

The FIGURE shows a tank venting system using a method and a device according to the present invention.

DETAILED DESCRIPTION

The tank venting system schematically represented in the FIGURE includes a tank 10 which is connected to activated carbon filter 14 via tank connecting line 12. An intake manifold 16 of an internal combustion engine [(not shown)] is connected to tank 10 via activated carbon filter 14, by intake line 18 through tank venting valve 20.

During operation of the internal combustion engine [(not shown)] or during filling of tank 10, volatile hydrocarbon vapors form in the tank and pass through line 12 into activated carbon filter 14, in which they are reversibly bound in a conventional manner.

By an intermittently opening tank venting valve 20 which is actuated by a control device [(not shown)] and by a correspondingly actuated reversing valve 32, fresh air 22 is then drawn in from the environment through activated carbon filter 14, with any accumulated fuel therein is released to the intake air, thereby regenerating activated carbon filter 14. Passive filter 24 is also provided which connects the system, i.e., a line 16, 16' connected upstream of activated carbon filter 14, to the ambient air from the vehicle surroundings.

Leak diagnostic unit 28, which is connected to activated carbon filter 14, is provided to diagnose the leak-tightness of the tank venting system. It should be noted that the position of the diagnostic unit as indicated inside the tank venting system shown is only an example, and that, depending on the technical application, the diagnostic unit may be situated in another location, such as directly on tank 10.

Diagnostic unit 28 shown includes vane-type pump 30 which is controlled by a control unit (not shown). It is understood that vane-type pump 30 only represents one type of pump, which optionally may be substituted by another type of pump such as a membrane pump or the like. Reversing valve 32, for example a 3/2-way valve, is connected upstream from the pump. Reference leak 36 is introduced in separate line branch 34 which is connected in parallel to reversing valve 32. The dimensions of reference leak 36 are chosen so that the reference leak corresponds approximately to the size of the leak to be detected. In the case of the aforementioned U.S. standard, the reference leak accordingly includes an opening cross-section of 0.5 mm.

Reversing valve 32 includes two switch positions. In the first position, corresponding to the first of two diagnostic steps, a reference measurement is performed in which reversing valve 32 between pump 30 and active carbon filter 14 is completely closed, so that pressure sensor 40 detects the dynamic pressure in connecting line 42 between pump 30 and pressure sensor 40 which is created by actuated pump 30 upstream from reference leak 36.

In the second valve position, pump 30 is pressure-conductively connected to tank 10 via activated carbon filter 14, thereby pumping outside air into tank 10. While fresh air is pumped into tank 10, which is the second of the two above-mentioned diagnostic steps, the dynamic pressure developing upstream from reversing valve 32 is detected by pressure sensor 40.

It should be emphasized that the presence of a leak in tank 10 may be determined directly and unambiguously only by using a single pressure sensor 40 to determine the diagnostic pressure as well as the reference pressure from the ratio of these two pressures.

Diagnostic unit 28 also includes a generally conventional computer module (not shown) for evaluating the variation of the dynamic pressure over time, the pressure is determined upstream from pump 30 by pressure sensor 40. Since a conventional microcontroller or processor is used, no further discussion of such is presented here.

It should also be noted that if a pump vane jams in pump 30, a pressure signal fluctuating over time results, which may be evaluated for monitoring the function of pump 30.

It is further noted that instead of tank diagnosis, the already described regeneration of activated carbon filter 14 may be performed in the first position of reversing valve 32 when tank vent valve 20 is simultaneously open.

Finally, it is noted that when tank 10 or the tank venting system is diagnosed using partial vacuum as previously described, the direction of the pressure of pump 10 need only be reversed while otherwise operating in a similar manner.

What is claimed is:

1. A method for leak testing a vessel, comprising the steps of:
   introducing one of a positive pressure and a partial vacuum into the vessel;
   detecting a variation over time of the one of the positive pressure and the partial vacuum in order to perform a leak-tightness measurement on said vessel and a corresponding reference measurement on said vessel using a reference leak in fluid communication with the one of the positive pressure and the partial vacuum;
   determining a presence of a leak in the vessel by comparing results of the leak-tightness measurement and the reference measurement;
   wherein during the leak-tightness measurement and the reference measurement, the one of the positive pressure and the partial vacuum is detected using a single pressure measuring device;
   and wherein the vessel and the reference leak are alternately subjected to the one of the positive pressure and the partial vacuum; and
   detecting and comparing respective resulting pressure variations upstream from a pressure source to one another, from which a determination is made as to leak-tightness of the vessel.

2. The method according to claim 1, wherein:
the vessel is a tank venting system of a motor vehicle.

3. The method according to claim 1, further comprising:
determining a malfunction of the pressure source from a fluctuation over time in a pressure characteristic that occurs upstream from the pressure source.

4. The method according to claim 3, further comprising:
the pressure source being a vane-type pump; and
diagnosing at least one jammed pump vane from a pressure fluctuation.

* * * * *